Patented Sept. 23, 1941

2,256,933

UNITED STATES PATENT OFFICE 2,256,933

PROCESS FOR OBTAINING A SUBSTANCE LOWERING THE BLOOD PRESSURE

Ernst Wollheim, Lund, Sweden

No Drawing. Application July 2, 1937, Serial No. 151,753. In Switzerland July 3, 1936

4 Claims. (Cl. 167—74)

In my U. S. patent application Serial No. 111,557 I have described a process for obtaining from human and animal urine a substance lowering the blood pressure, said substance having the special property of being resistant to boiling. According to said process all components of the urine not resistant to boiling are destroyed by boiling up before, during or after application of methods for concentration or separation of the desired substance as generally used for the production of hormones and the like.

Now I have found that the components not resistant to boiling can be destroyed in the mixture containing the desired substance not only by boiling up a solution of this mixture but also by any kind of heating, if such heating is executed in a manner not to cause detrimental modifications of the active substance lowering the blood pressure. This may for instance be attained by heating the intermediate products containing the hormones and obtained by working up the urine, e. g., the corresponding solutions in vacuo or under pressure, or by heating the corresponding precipitates to 100–150° C. and even higher in a suitable drying oven.

For instance, the sediment obtained from urine by precipitating with methanol or ammonium sulfate or by the combined use of both these chemicals in accordance to my prior U. S. patent application Serial No. 111,557 may be heated in a drying oven to 100–150° C. and afterwards be washed and dried in a convenient manner, as described in the aforesaid U. S. patent application. But the heating may also be executed after the desired preparation of the active substance is finished in all other respects, namely, directly before it is packed or transferred into the ampullas. In all other respects the working up may be executed according to what is indicated in my prior U. S. patent application Serial No. 111,557.

Examples (1) 17 liters of urine are neutralized and filtered. In this urine 7 kilos of ammonium sulphate (about 41% based on the urine) are dissolved. A fine, rather colourless sediment then separates slowly. The mass is left standing at ordinary or reduced temperature during several hours, for instance over night, until the separation is complete, after which it is filtered off. The solid residue is heated in a drying oven or the like to about 100–150° C. for some minutes, then is taken up with 700 cubic centimeters of water, and the solution so produced is separated from any remaining residue. From the aqueous solution obtained the active substance is precipitated anew by saturating with sulphate of ammonia. Again a white sediment is formed which, when complete, is filtered off just as in the first time and then is dissolved in water. From the again formed solution the sulphate of ammonia is eliminated by any convenient method, for instance by dialysis or electrodialysis, or the like. This is possible because the active substance lowering the blood pressure is not dialysable.

If 0.5 to 1 cubic centimeter of the obtained solution is injected into a rabbit, the blood pressure of this animal will be lowered very considerably for about thirty minutes to one hour.

(2) The solution obtained according to the example by dissolving in 700 cubic centimeters of water the first precipitate obtained by means of sulphate of ammonia, may be purified further by treating said solution with five times its quantity of methanol or four times its quantity of anhydrous acetone. The active substance is precipitated thereby and is freed from the remaining solution by filtration or by centrifuging. The obtained solid product is repeatedly washed with a mixture of ether and either concentrated or absolute alcohol and is then dissolved again by means of 200 cubic centimeters of water. This solution is freed from impurities, especially from salts contained therein, by dialysis or electrodialysis during 24 hours. The remaining solution containing the active substance may be used as such or may be further concentrated in vacuo, if desired.

Instead of first treating the urine with sulphate of ammonia and thereafter treating the solution obtained from the first precipitate with methanol or the like, one may also proceed in the reverse order by first treating the urine with methanol or acetone, dissolving the thus obtained precipitate in water and then precipitating the active substance afresh from this solution by means of sulphate of ammonia.

(3) 15 liters of urine are neutralized and filtered. Then 8 kilos of sodium sulphate (about 53% based on the urine) are dissolved in this filtrate. A considerable quantity of sediment slowly separates. The mass is left standing for some hours, preferably over night, at ordinary or reduced temperature until the separation will be completed. The sediment then is filtered off and washed three times with concentrated alcohol and ether. Thereafter it is taken up with 600 cubic centimeters of water and shaken therewith during 4 hours, whereupon the formed solution is separated from any remaining residue. To the solution thus obtained five times its quantity of methanol or four times its quantity of anhydrous acetone are added. The precipitated active substance is separated from the remaining solution. The obtained solid product is then repeatedly washed in the manner indicated in Example 2 and thereafter is heated for a short time to about 100°–150° C. The thus obtained solid substance may either be used as such or it may further be purified in the manner indicated in Example 2.

(4) The new process is also applicable to the corresponding products obtained from the pituitary gland, particularly from its posterior lobe, and to the intermediates obtained therein.

For this purpose 100 grams of the posterior lobe of the pituitary gland of a beef animal or hog may be repeatedly extracted with glacial acetic acid and the extracts thus obtained are precipitated with a mixture of ethyl and petroleum ethers. The strongly acid, thick and syrupy liquid, filtered off from the precipitate then is shaken with a quantity of sodium hydroxide, calculated to neutralize the quantity of glacial acetic acid employed, and this sodium hydroxyde preferably is employed in the solid and powdered state. The sediment formed therein contains the desired active substance. To extract the formed sodium acetate it is mixed with the least possible amount of water to dissolve the said salt. The residue left after removal of the salt solution now is heated for some minutes to about 100° C. and thereafter may be extracted with larger quantities of water, e. g. with one liter of water. The active substance is thereby dissolved. This extract may be employed as it is, if desired after concentration, or it can further be purified by deaminizing with sodium nitrite and sulphuric acid, or the like.

It was not to be anticipated at all, that it would be possible to heat the active substance lowering the blood pressure even in the solid state to such a degree, that the associated substances not resistant to boiling are destroyed without causing any harm to the desired active substance lowering the blood pressure. The possibility of such a treatment offers important advantages. Particularly it is to be taken into account, that, since the active substance lowering the blood pressure is contained in the urine only in a very low concentration (less than 1%), to heat the solid substance instead of the original solution constitutes a very great simplification, especially as to the heating apparatus, but also with reference to the calories to be used for the heating. For according to my prior method the urine to be worked up has to be boiled in its totality, whereby very large devices were needed and very large quantities of liquids had to be brought to boiling temperature. If, according to my present invention, it is the final product which is heated to destroy the associated substances, simultaneously a perfect sterilisation of the preparation is attained, which then can directly be packed or transferred into the ampullas.

(5) 10 litres of urine are evaporated to dryness in vacuo. This dried substance is washed many times with ether and alcohol. It is then taken up in about 1 litre of distilled water. The clear solution thus obtained is then mixed with about five times its quantity of methyl alcohol. After about 24 hours standing, the precipitate is decanted and separated by centrifuging. This precipitate is then washed with ether and dried in vacuo. The obtained substance is heated for about 5 minutes to 100°–150° C. in a drying oven. For use, the dried substance may be dissolved in water to form a 10% solution.

The present application is in part a continuation of and an improvement upon the process described in my copending application 111,557 filed in U. S. November 18, 1936.

Having now particularly described and ascertained the nature of my said invention, I declare that what I claim is:

1. In the treatment of hormone material of the kind present in healthy urine and in the posterior lobe of the pituitary gland, and insoluble in concentrated ammonium sulphate solution, and containing a substance capable of lowering the blood pressure, the herein described step of heating such material in a solid state to a temperature between about 100° C., and about 150° C., to destroy substances which are not stable at such temperatures.

2. The herein described step in the preparation of an active hormone capable of lowering blood pressure, from the constituents of healthy urine that are insoluble in concentrated ammonium sulphate solution, which comprises heating said insoluble material in the solid state, to at least about 100° C. but to not considerably above 150° C., whereby said hormone is left active but other physiologically active material therein is destroyed.

3. In the treatment of hormone material of the type precipitatable from healthy urine by adding ammonium sulphate thereto, and containing a hormone capable of lowering blood pressure and other physiologically active material, the step of heating said hormone material in the solid state, to at least 100° C., but not considerably above 150° C., whereby said hormone capable of lowering blood pressure is left potent for that purpose and the other physiologically active material is destroyed.

4. A process of obtaining from urine a substance capable of lowering blood pressure which comprises treating the urine with a precipitant capable of precipitating said blood-pressure-lowering substance while associated with other physiologically active constituents and thereafter heating said precipitated material, while in the solid state, to a temperature between 100° C. and 150° C., whereby constituents thereof which are not stable at such temperatures are destroyed.

ERNST WOLLHEIM.